United States Patent
Park

(10) Patent No.: US 10,177,349 B2
(45) Date of Patent: Jan. 8, 2019

(54) SECONDARY BATTERY

(71) Applicant: SAMSUNG SDI CO., LTD., Yongin-si, Gyeonggi-do (KR)

(72) Inventor: Wanwoo Park, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 339 days.

(21) Appl. No.: 14/632,387

(22) Filed: Feb. 26, 2015

(65) Prior Publication Data

US 2015/0357689 A1    Dec. 10, 2015

(30) Foreign Application Priority Data

Jun. 10, 2014   (KR) .................. 10-2014-0070266

(51) Int. Cl.
| | |
|---|---|
| *H01M 10/655* | (2014.01) |
| *H01M 2/22* | (2006.01) |
| *H01M 2/02* | (2006.01) |
| *H01M 10/42* | (2006.01) |

(52) U.S. Cl.
CPC ........... *H01M 2/027* (2013.01); *H01M 2/021* (2013.01); *H01M 2/0212* (2013.01); *H01M 2/0275* (2013.01); *H01M 2/22* (2013.01); *H01M 10/425* (2013.01); *H01M 2200/10* (2013.01)

(58) Field of Classification Search
None
See application file for complete search history.

(56) References Cited

U.S. PATENT DOCUMENTS

| | | | |
|---|---|---|---|
| 2011/0123838 A1* | 5/2011 | Lee ...................... | H01M 2/0207 429/7 |
| 2013/0089762 A1* | 4/2013 | Hong .................... | H01M 2/348 429/62 |
| 2013/0149600 A1 | 6/2013 | Park et al. | |

FOREIGN PATENT DOCUMENTS

| | | |
|---|---|---|
| CN | 103035970 A | 4/2013 |
| CN | 103165846 A | 6/2013 |
| JP | 2014-053281 A | 3/2014 |
| KR | 10-2008-0039093 A | 5/2008 |
| KR | 10-2011-0056698 A | 5/2011 |
| KR | 10-2013-0038142 A | 4/2013 |
| KR | 10-2013-0065290 A | 6/2013 |

OTHER PUBLICATIONS

Office Action issued by the Chinese Patent Office dated Jul. 3, 2018 in the examination of the Chinese Patent Application No. 201510312345.5.

* cited by examiner

*Primary Examiner* — Daniel S Gatewood
(74) *Attorney, Agent, or Firm* — Lee & Morse P.C.

(57) ABSTRACT

Provided is a secondary battery, including a bare cell including a terrace-shaped part on a side thereof; an insulation film attached to the terrace-shaped part; and a thermal protection device on the insulation film. The thermal protection device includes a transfer part; and a first lead terminal and a second lead terminal on both sides of the transfer part. The insulation film includes an opening overlapping the transfer part. The transfer part directly contacts the terrace-shaped part through the opening.

2 Claims, 3 Drawing Sheets

SECONDARY BATTERY

CROSS-REFERENCE TO RELATED APPLICATION

Korean Patent Application No. 10-2014-0070266, filed on Jun. 10, 2014, in the Korean Intellectual Property Office, and entitled: "Secondary Battery," is incorporated by reference herein in its entirety.

BACKGROUND

1. Field

One or more embodiments relate to a secondary battery.

2. Description of the Related Art

Unlike primary batteries, secondary batteries may be rechargeable. With increasing widespread use of devices such as laptop computers and mobile communication devices, secondary batteries may be widely used as power sources for such devices.

SUMMARY

Embodiments may be realized by providing a secondary battery, including a bare cell including a terrace-shaped part on a side thereof; an insulation film attached to the terrace-shaped part; and a thermal protection device on the insulation film. The thermal protection device includes a transfer part; and a first lead terminal and a second lead terminal on both sides of the transfer part. The insulation film includes an opening overlapping the transfer part. The transfer part directly contacting the terrace-shaped part through the opening.

The transfer part may include a base element; and a cover on the base element. A lower surface of the base element may not be covered by the cover and may be recessed inward from a lower end of the cover.

The terrace-shaped part may include a contact part directly contacting the lower surface of the base element.

The contact part may include a protrusion protruding toward the lower surface of the base element.

The contact part may include a thermally conductive layer directly contacting the lower surface of the base element.

The contact part may include a recess to receive the transfer part, and a thermally conductive layer may be in the recess and may contact the lower surface of the base element.

The bare cell may include an electrode assembly; and a pouch sealing the electrode assembly and forming the terrace-shaped part. A first electrode tab and a second electrode tab may be electrically connected to the electrode assembly, and the first and second electrode tabs may extend outward through the terrace-shaped part.

A first connection tab may be connected to the first lead terminal, and a second connection tab may be connected to the second lead terminal, and the first electrode tab may be bent toward the terrace-shaped part and joined to the first connection tab.

The second electrode tab and the second connection tab may be connected to external terminals.

The first and second lead terminals may be electrically connected to the base element, and the first and second lead terminals may penetrate the cover and extend in opposite directions.

The terrace-shaped part may be located outside an outer periphery of the bare cell defined by sides thereof.

The terrace-shaped part may be parallel with a lower surface of the bare cell.

An upper surface of the terrace-shaped part may be in a same plane as a lower surface of the bare cell.

An upper surface of the terrace-shaped part, except for the contact part, may be in a same plane as a lower surface of the bare cell; and an upper surface of the contact part may be higher than the upper surface of the terrace-shaped part.

An upper surface of the terrace-shaped part, except for the contact part, may be in a same plane as a lower surface of the bare cell; and an upper surface of the contact part may be lower than the upper surface of the terrace-shaped part.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
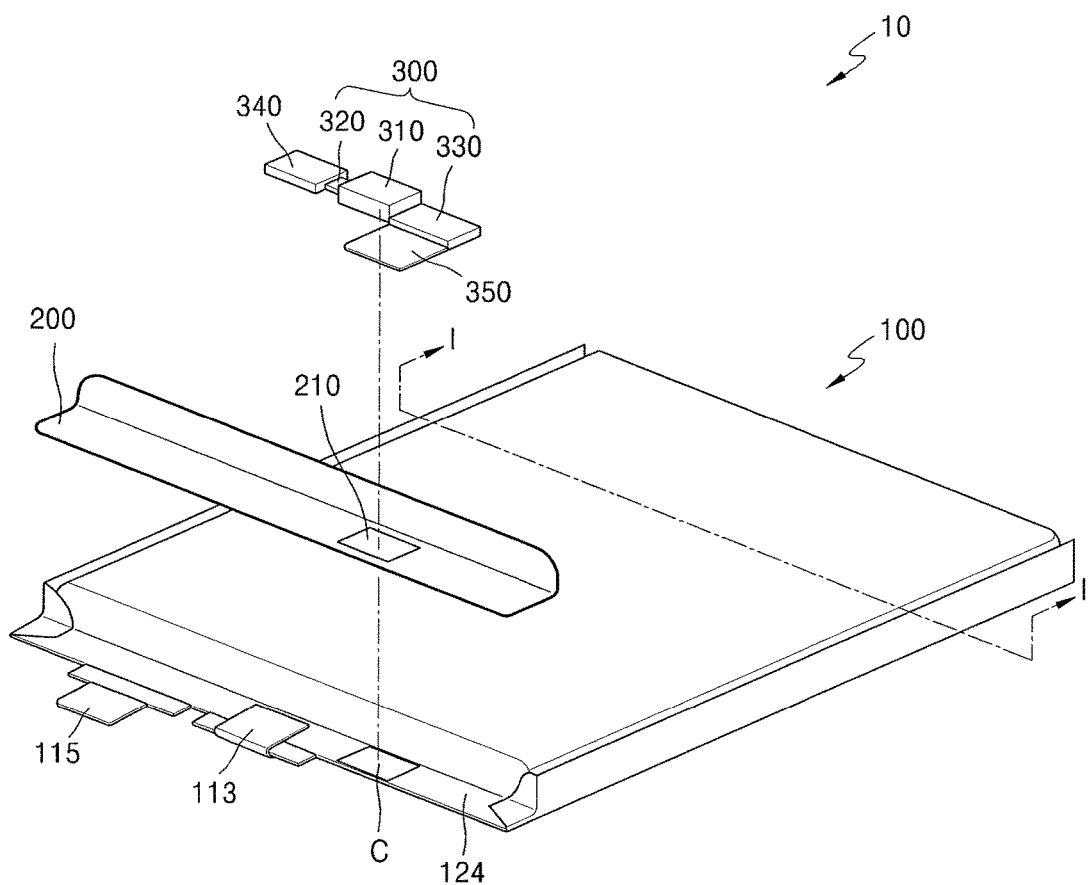
FIG. 1 illustrates a schematic perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations will be ruled out.

It will be understood that although the terms "first" and "second" are used herein to describe various elements, these elements should not be limited by these terms. Terms are only used to distinguish one element from other elements.

In the following description, technical terms are used only for explaining a specific exemplary embodiment. The terms of a singular form may include plural forms unless referred to the contrary. The meaning of "include" or "comprise" specifies a property, a fixed number, a step, a process, an element, a component, and a combination thereof but does not exclude other properties, fixed numbers, steps, processes, elements, components, and combinations thereof.

Figure 2:
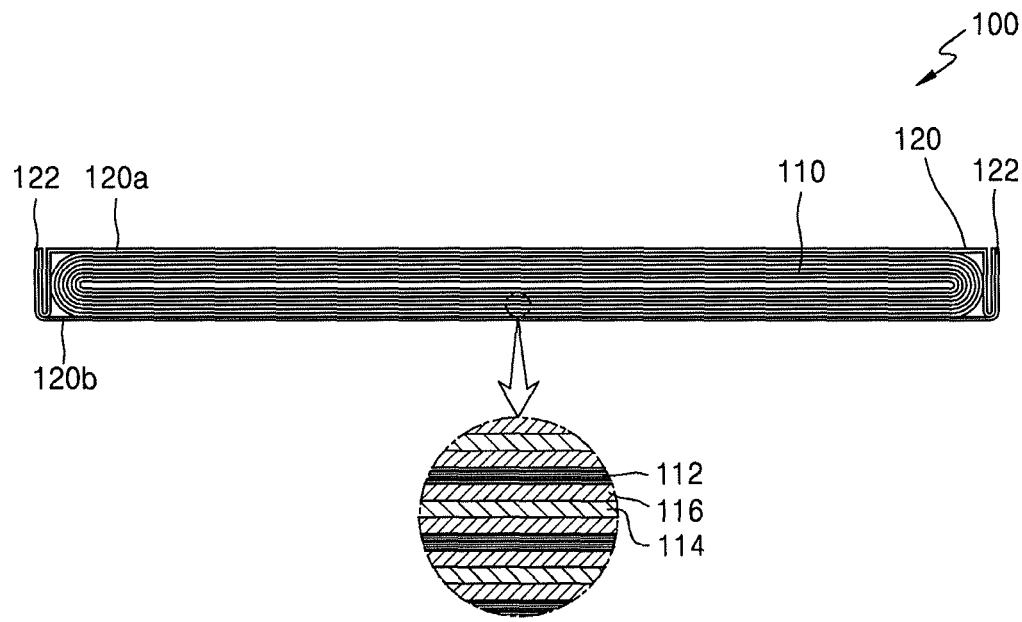
FIG. 2 illustrates a schematic cross-sectional view taken along a line I-I of FIG. 1.
Figure 3:
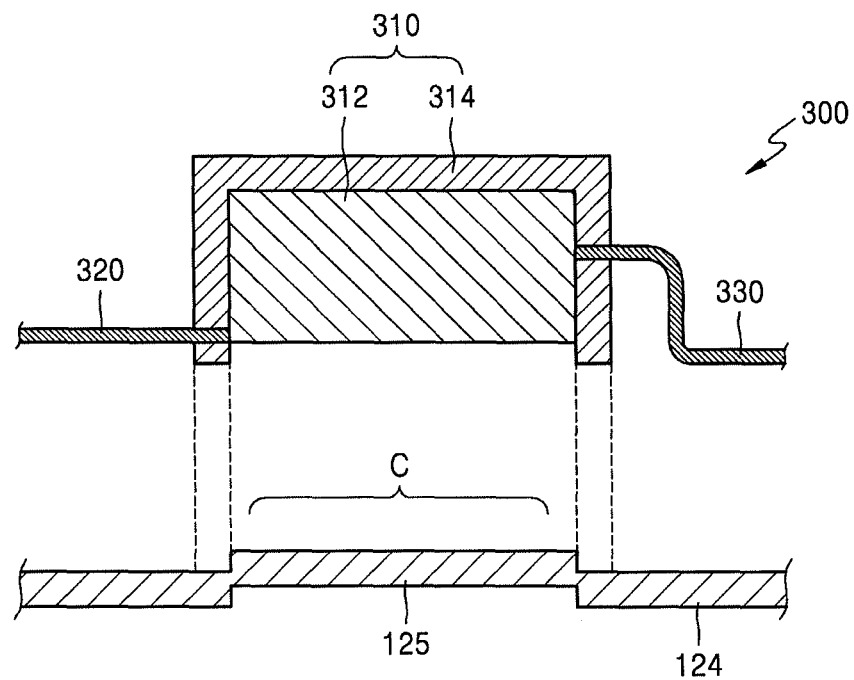
FIGS. 3-5 each illustrates a schematic cross-sectional view of an exemplary contact structure between a terrace-shaped part and a thermal protection device illustrated in FIG. 1.

FIG. 1 illustrates a schematic perspective view of a secondary battery 10 according to an embodiment, FIG. 2 is a schematic cross-sectional view taken along a line I-I of FIG. 1, and FIG. 3 illustrates a schematic cross-sectional view of an exemplary contact structure between a thermal protection device 300 and a terrace-shaped part 124 illustrated in FIG. 1.

Referring to FIGS. 1 to 3, the secondary battery 10 of the embodiment may include: a bare cell 100 including the terrace-shaped part 124 on a side thereof; an insulation film 200 attached to the terrace-shaped part 124; and the thermal protection device 300 disposed on the insulation film 200.

The bare cell 100 may include an electrode assembly 110 and a pouch 120 sealing the electrode assembly 110.

The electrode assembly 110 may include a first electrode plate 112, a second electrode plate 114, and a separator 116 disposed between the first electrode plate 112 and the second electrode plate 114. For example, the electrode assembly 110 may be formed in the shape of a jelly roll by sequentially stacking and winding the first electrode plate 112, the separator 116, and the second electrode plate 114.

The first electrode plate 112 may be one of a positive electrode film and a negative electrode film. The first electrode plate 112 may be a positive electrode film, and the second electrode plate 114 may be a negative electrode film. The first electrode plate 112 may be a negative electrode film, and the second electrode plate 114 may be a positive electrode film. The first and second electrode plates 112 and 114 are not limited to having particular polarities as long as the first and second electrode plates 112 and 114 have different polarities. For clarity, the following description will be presented under the assumption that the first electrode plate 112 is a positive electrode film and the second electrode plate 114 is a negative electrode film.

The first electrode plate 112 may include a first active material portion coated with a first active material, and a first non-coating portion not coated with the first active material. For example, the first active material portion may be formed by partially coating at least one side of an aluminum plate with the first active material, and the other portion of the aluminum plate not coated with the first active material may be the first non-coating portion. The first active material may be a positive electrode active material, and the positive electrode active material may be a lithium-containing transition metal oxide such as $LiCoO_2$, $LiNiO_2$, $LiMnO_2$, or $LiMnO_4$, or a lithium chalcogenide.

The second electrode plate 114 may include a second active material portion coated with a second active material, and a second non-coating portion not coated with the second active material. For example, the second active material portion may be formed by partially coating at least one side of a copper plate with the second active material, and the other portion of the copper plate not coated with the second active material may be the second non-coating portion. For example, the second active material may be a negative electrode active material, and the negative electrode active material may be a carbon material such as crystalline carbon, amorphous carbon, a carbon composite, or carbon fiber, a lithium metal, or a lithium alloy.

The separator 116 may be formed of a porous polymer film such as a porous polyethylene film or a porous polypropylene film. The separator 116 may further include ceramic particles. The separator 116 may be formed of a solid polymer electrolyte. The separator 116 may be an independent film or may be a porous layer formed on the first electrode plate 112 or the second electrode plate 114.

A first electrode tab 113 and a second electrode tab 115 may be electrically connected to the electrode assembly 110. The first electrode tab 113 may be joined to the first electrode plate 112, and the second electrode tab 115 may be joined to the second electrode plate 114, to transfer electrical energy generated by the electrode assembly 110. An end of the first electrode tab 113 may be joined to the first non-coating portion by a method such as welding, and an end of the second electrode tab 115 may be joined to the second non-coating portion by a method such as welding.

The pouch 120 may seal the electrode assembly 110 and may accommodate an electrolyte together with the electrode assembly 110. The pouch 120 may include a first sealing sheet 120a disposed on a first surface of the electrode assembly 110 and a second sealing sheet 120b disposed on a second surface of the electrode assembly 110.

Each of the first and second sealing sheets 120a and 120b may have a three layer structure including a first insulation layer, a metal layer, and a second insulation layer. For example, the metal layer may be formed of a material such as, for example, aluminum or stainless steel, and the first and second insulation layers may be formed of a material such as, for example, chlorinated polypropylene (CPP), polyethylene terephthalate (PET), or nylon.

For example, an accommodation space may be formed in the first sealing sheet 120a through a drawing process, to accommodate the electrode assembly 110. After the electrode assembly 110 is accommodated in the accommodation space, the second sealing sheet 120b having an edge continuously connected to an edge of the first sealing sheet 120a may be bent toward the first sealing sheet 120a, and edge portions of the first and second sealing sheets 120a and 120b may be joined together along the boundary of the accommodation space by a fusion joining method.

The electrode assembly 110 may be sealed by the pouch 120, and the joined edge portions of the first and second sealing sheets 120a and 120b may form a pair of lateral wing parts 122 and the terrace-shaped part 124. The pair of lateral wing parts 122 may be bent in parallel with lateral sides of the bare cell 100, and the insulation film 200 may be attached to the terrace-shaped part 124.

The terrace-shaped part 124 may be located outside an outer periphery of the bare cell 100 defined by sides, e.g., lateral side, thereof. The terrace-shaped part 124 may be parallel with a lower surface of the bare cell 100. An upper surface of the terrace-shaped part 124 may be in a plane parallel to, e.g., in a same plane as, a lower surface of the bare cell 100, i.e., the lower surface of the bare cell 100 may contact the second sealing sheet 120b of the pouch 120, e.g., an upper surface of the second sealing sheet 120b of the pouch 120.

The insulation film 200 may be attached to the entirety of the terrace-shaped part 124 to prevent a short circuit between the metal layers of the pouch 120 and the second electrode tab 115. The insulation film 200 may include an opening 210. The opening 210 may be formed at a position overlapping a transfer part 310 of the thermal protection device 300.

The thermal protection device 300 may be disposed on the insulation film 200 and may interrupt a current, for example, if the bare cell 100 is heated to a set temperature or higher to prevent burning or explosion of the bare cell 100.

The thermal protection device 300 may include the transfer part 310 and first and second lead terminals 320 and 330 disposed on both sides of the transfer part 310.

The transfer part 310 may include a base element 312 and a cover 314 covering the base element 312.

The base element 312 may reversibly function as a conductor or an insulator according to temperature. For example, the base element 312 may be a polymer positive temperature coefficient (PTC) device, formed by dispersing conductive particles such as metal or carbon particles into a crystalline polymer, or may be a fuse, a current interrupting element, or a bimetal element.

A lower surface of the base element 312 may not be covered with the cover 314 but may be exposed to the outside, and the lower surface of the base element 312 may be recessed inward from a lower end of the cover 314.

The first and second lead terminals 320 and 330 may be electrically connected to the base element 312, and the first and second lead terminals 320 and 330 may penetrate the cover 314 and extend in opposite directions. A first connection tab 340 may be connected to the first lead terminal 320, and a second connection tab 350 may be connected to the second lead terminal 330.

In addition, the first electrode tab 113 may be bent and joined to the first connection tab 340. For example, the first electrode tab 113 may be bent toward the terrace-shaped part 124 and joined to the first connection tab 340. Then, for example, the second electrode tab 115 and the second connection tab 350 may be connected to external terminals of a protective circuit module (not shown).

As described above, the opening 210 of the insulation film 200 may overlap the transfer part 310. The transfer part 310 may be brought into direct contact with the terrace-shaped part 124 through the opening 210, heat generated in the electrode assembly 110 and transferred to the pouch 120 may be directly transferred to the transfer part 310 without being blocked by the insulation film 200, and the base element 312 may immediately respond to a temperature variation of the bare cell 100.

The terrace-shaped part 124 may include a contact part C making direct contact with the lower surface of the base element 312 for effective heat transfer therebetween.

For example, the contact part C may include a protrusion 125 protruding toward the lower surface of the base element 312. For example, the protrusion 125 may be formed by lifting a portion of the terrace-shaped part 124 through a punching process.

For effective contact between the protrusion 125 and the lower surface of the base element 312, the height of the protrusion 125 may be equal to or greater than the depth of the lower surface of the base element 312 measured from the lower end of the cover 314. In addition, the protrusion 125 may have the same shape as the shape of the lower surface of the base element 312. In an embodiment, an upper surface of the terrace-shaped part, except for the contact part, may be in a same plane as a lower surface of the bare cell, and an upper surface of the contact part may be higher than an upper surface of the terrace-shaped part.

As described above, the contact part C may be formed on the terrace-shaped part 124 for direct contact with the lower surface of the base element 312, the base element 312 may sensitively respond to a temperature variation of the bare cell 100, the thermal protection device 300 may operate more reliably, the secondary battery 10 may operate more stably.

Figure 4:
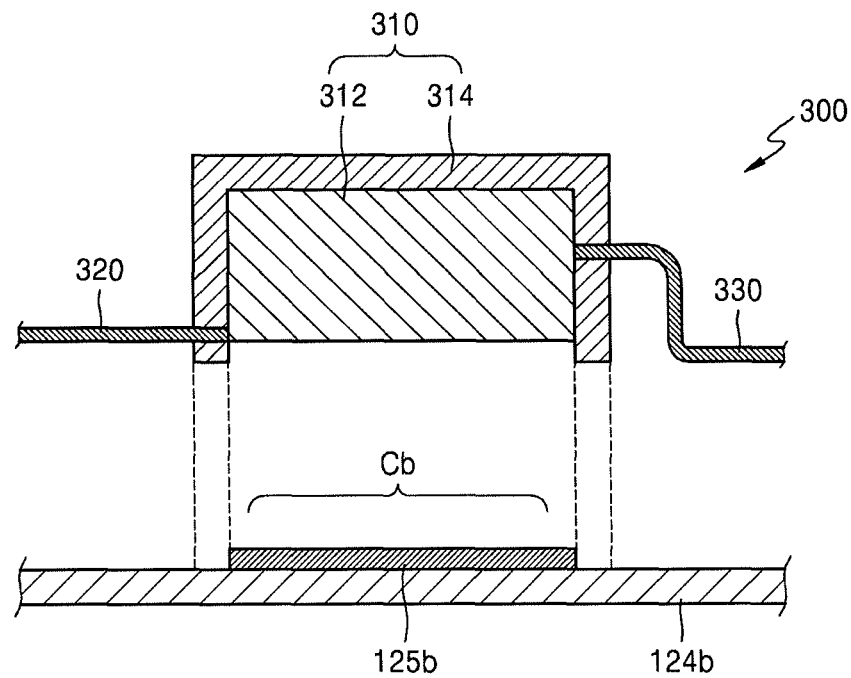

FIG. 4 illustrates a schematic cross-sectional view of an exemplary contact structure between the terrace-shaped part 124 and the thermal protection device 300 illustrated in FIG. 1.

Referring to FIG. 4, a thermal protection device 300 may include a transfer part 310 and first and second lead terminals 320 and 330 disposed on both sides of the transfer part 310. The transfer part 310 may be directly placed on a terrace-shaped part 124b through the opening 210 (refer to FIG. 1) of the insulation film 200 (refer to FIG. 1).

The transfer part 310 may include a base element 312 and a cover 314 covering the transfer part 310. The base element 312 may reversibly function as a conductor or an insulator according to temperature. For example, the base element 312 may be a polymer PTC device formed by dispersing conductive particles such as metal or carbon particles into a crystalline polymer, or may be a fuse, a current interrupting element, or a bimetal element. In addition, a lower surface of the base element 312 may be recessed inward from a lower end of the cover 314.

The terrace-shaped part 124b may include a contact part Cb making direct contact with the lower surface of the base element 312. For example, the contact part Cb may include a thermally conductive layer 125b making contact with the lower surface of the base element 312. The thermally conductive layer 125b may be formed of a material having high thermal conductivity such as copper, aluminum, or nickel.

For effective contact between the thermally conductive layer 125b and the lower surface of the base element 312, the thickness of the thermally conductive layer 125b may be equal to or greater than the depth of the lower surface of the base element 312 measured from the lower end of the cover 314, and the shape of the thermally conductive layer 125b may be identical to the shape of the lower surface of the base element 312.

The thermally conductive layer 125b and the lower surface of the base element 312 may be brought into contact with each other by attaching the thermally conductive layer 125b to the terrace-shaped part 124b and placing the thermal protection device 300 on the insulation film 200 (refer to FIG. 1). In an embodiment, after the thermally conductive layer 125b is attached to the base element 312, the thermal protection device 300 may be placed on the insulation film 200 (refer to FIG. 1).

As described above, the contact part Cb may be formed on the terrace-shaped part 124b for direct contact with the lower surface of the base element 312, and the thermal protection device 300 may operate more reliably, and the secondary battery 10 may operate more stably.

Figure 5:
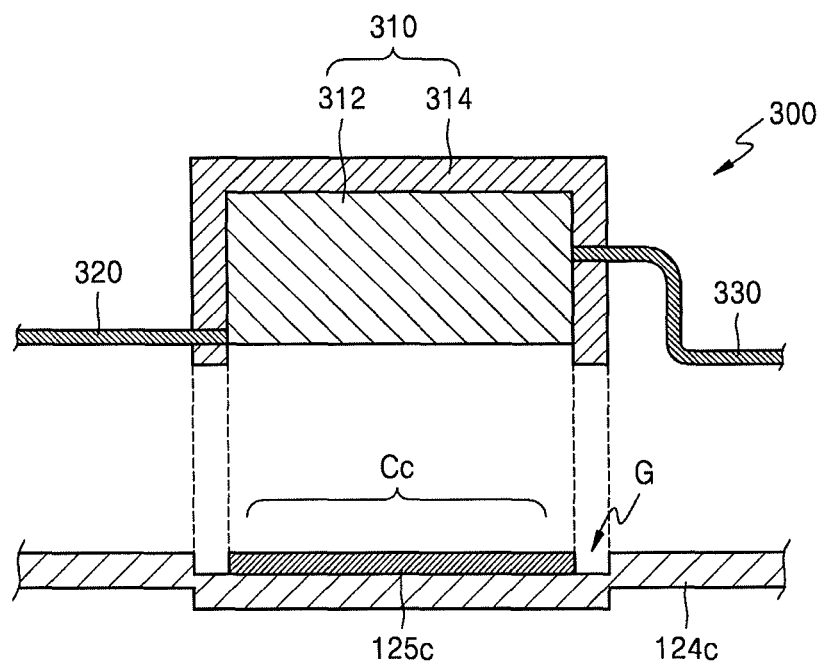

FIG. 5 illustrates a schematic cross-sectional view of an exemplary contact structure between the terrace-shaped part 124 and the thermal protection device 300 in FIG. 1.

Referring to FIG. 5, a thermal protection device 300 may include: a transfer part 310 including a base element 312 and a cover 314 covering the base element 312; and first and second lead terminals 320 and 330 connected to the transfer part 310 and extending through the cover 314 in opposite directions.

The transfer part 310 may be directly placed on a terrace-shaped part 124c through the opening 210 (refer to FIG. 1) of the insulation film 200 (refer to FIG. 1), and a lower surface of the base element 312 may be recessed inward from a lower end of the cover 314.

The terrace-shaped part 124c may include a contact part Cc making direct contact with the lower surface of the base element 312. For example, the contact part Cc may include a recess G to receive the transfer part 310, and a thermally conductive layer 125c may be placed in the recess G.

For example, the recess G may be formed by pushing a portion of the terrace-shaped part 124c in a direction opposite to the transfer part 310 through a punching process. The size of the recess G may be equal to or greater than the size of the transfer part 310, and the position of the transfer part 310 may be easily determined by placing the transfer part 310 in the recess G.

The thermally conductive layer 125c placed in the recess may be formed of a material such as copper, aluminum, or nickel. For effective contact between the thermally conductive layer 125c and the lower surface of the base element 312, the thickness of the thermally conductive layer 125c may be equal to or greater than the depth of the lower surface of the base element 312 measured from the lower end of the cover 314, and the shape of the thermally conductive layer 125*c* may be identical to the shape of the lower surface of the base element 312. In an embodiment, an upper surface of the terrace-shaped part, except for the contact part, may be in a same plane as a lower surface of the bare cell; and an upper surface of the contact part is lower than an upper surface of the terrace-shaped part.

As described above, the contact part Cc may be formed on the terrace-shaped part 124*c* for direct contact with the lower surface of the base element 312, the thermal protection device 300 may operate more reliably, and the secondary battery 10 may operate more stably.

By way of summation and review, single-cell secondary batteries or multi-cell secondary batteries each having a plurality of electrically-connected battery cells may be used according to the types of devices using the secondary batteries. For example, a small device such as a cellular phone may be operated for a predetermined period of time by using a single-cell battery, and a device requiring a high-power and high-capacity power source, such as a laptop computer or a small personal computer (PC), may be operated using a multi-cell battery in which battery cells may be connected in series, parallel, or series-parallel. Secondary batteries may include highly reactive materials, and the stability of secondary batteries should be guaranteed for preventing accidents such as explosions caused by overcharging.

As described above, according to the one or more of the embodiments, the stability of the secondary battery may be improved.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
a bare cell including a terrace-shaped part on a side thereof, the terrace-shaped part including a contact part;
an insulation film attached to the terrace-shaped part; and
a thermal protection device on the insulation film, the thermal protection device including:
a transfer part; and
a first lead terminal and a second lead terminal on both sides of the transfer part,
the insulation film including an opening overlapping the transfer part, wherein:
the contact part of the terrace-shaped part includes a recess to receive the transfer part, and
the transfer part contacts the contact part of the terrace-shaped part through the opening of the insulation film and the recess of the contact part of the terrace-shaped part, wherein
a thermally conductive layer is in the recess of the contact part of the terrace-shaped part, and contacts a lower surface of the transfer part.

2. The secondary battery as claimed in claim 1, wherein:
an upper surface of the terrace-shaped part, except for the contact part, is in a same plane as a lower surface of the bare cell, and
an upper surface of the contact part is lower than the upper surface of the terrace-shaped part.

* * * * *